United States Patent Office 3,215,199
Patented Nov. 2, 1965

3,215,199
ACIDIZING OIL FORMATIONS
Richard E. Dilgren, Houston, Tex., assignor to Shell Oil Company, New York, N.Y., a corporation of Delaware
No Drawing. Filed Feb. 21, 1963, Ser. No. 260,319
11 Claims. (Cl. 166—38)

The invention relates to the treatment of subterranean formations penetrated by well bores, and more particularly pertains to methods for the treatment of such formations with acid to effect an increase in permeability. The present application is a continuation-in-part of patent application, Serial No. 168,810, and now abandoned, filed January 25, 1962.

Acidization of earth formations, particularly calcareous earth formations, has been practiced for some time for the purpose of increasing the permeability or flow of fluids therethrough. In the usual well acidizing operations, a hydrachloric acid solution is introduced into the well, and, when sufficient pressure is available or supplied, and the formation is sufficiently permeable, the acid also enters the adjacent subterranean formation. However, this method has the disadvantage of producing an ineffective acidizing action because the acid is largely neutralized by the reactive material immediately adjacent the well bore before the acid can reach other desired portions of the formation.

It is therefore the main object of the present invention to avoid the above and other defects of the prior art processes of acidizing oil formations. It is another object of the invention to provide a process whereby the inorganic acid necessary for the acidization is produced or liberated in situ in the region where it is desired to effect the acidization of the formation. It is still another object to provide a formation acidization process particularly applicable to treatment of moderate and relatively high temperature formations or reservoirs. It is still another object to provide an acidizing fluid capable of remaining substantially inert in respect to its acidizing action during the relatively long time required to inject an acidizing fluid deep into a subterranean formation.

It has now been discovered that the above and other objects of the present invention may be attained by using organic halides which are caused to react in situ with a solvating medium to form as one of the products of reaction, hydrogen halide. The invention may therefore be stated to reside broadly in a process of treating a subterranean earth formation by contacting it with a liquid containing, comprising or even consisting essentially of an organic halide which is dissolved in or intimately contacted or commingled with a solvating medium, said organic halide and solvating medium being capable of reacting at the formation temperature to produce a hydrogen halide, and preferably being present in proportions sufficient to produce enough hydrogen halide to cause acidization of the subterranean formations. Also, it is highly desirable that the organic halide and the solvating medium are selected and compounded to form a liquid mixture in which their rate of reaction is relatively slow at the ambient temperature at the well site but is significantly more rapid and comprises a preselected rate at the temperature of the formation that is to be treated. Where it is desirable to acidize portions of the formation immediately adjacent the well, e.g., to reduce a "skin effect," the reaction rate is preferably much higher at the formation temperature than it is at the surface temperature. Where it is desirable to acidize a large interval or a tight formation, e.g., in treating a low permeability gas reservoir, the reaction rate is preferably comparatively low but significantly more rapid at the formation temperature than it is at the surface temperature.

The invention may therefore be stated to reside also in a process of treating a subterranean formation traversed by a well by introducing through said well and into the formation a single, substantially homogenous, acid-producing treating liquid comprising, containing or consisting of a reactive mixture of an organic halide and a solvating medium having a rate of reaction which varies with temperature, said reagents being so selected that they react very slowly, while the treating liquid mixture is conveyed into the well and through a portion of the well conduit, but will interact to form an active acid (namely, hydrogen halide) at the temperature existing in the formation to be treated.

In one of its more specific embodiments, the process of the present invention comprises introducing into a formation to be acidized a liquid mixture (which term includes within its definition a solution) comprisng, containing, or consisting of an aliphatic monochloride and an aqueous solution of an aliphatic alcohol in amounts to produce within the formation, by solvolylsis, sufficient hydrogen chloride to increase substantially the productivity of the subterranean formation by acidization by said inorganic acid, and maintaining said introduced mixture or solution in the formation for a time sufficient to effect, at the formation temperature, said interaction between the aliphatic monochloride and the aqueous alcohol solution to convert all of the organic chloride, thereby producing sufficient hydrogen chloride for said acidization.

An advantage of using the process of the present invention, i.e., a process in which a single substantially homogeneous liquid is injected into the formation resides in the ability of selecting the proper or suitable organic halide and solvating medium so that they react in the formation to be treated (i.e., at the particular formation temperature) to convert all of the organic halide to produce the desired active acid (i.e., hydrogen halide acid).

Both the total amount of the two reactants, i.e., the organic halide and the solvating medium, as well as the ratio of one to the other may vary within rather wide limits. In acidizing a subterranean formation, it is generally preferable to employ a ratio of the reactants in which there is a stoichiometric excess of the solvating medium. In so acidizing a formation, the hydrogen halide reacts with components of the formation substantially as soon as the hydrogen halide is formed. The reaction between the organic halide and the solvating medium proceeds to completion and produces an amount of hydrogen halide equivalent to the amount of the organic halide which was used.

A reason for not using a mixture or solution having a stoichiometric excess of the organic halide is that it is normally highly undesirable to produce a crude oil containing even minute quantities of organic halide. The reason for this is that this organic halide normally adversely affects the catalyst used in the catalytic treatment to which crude oils are usually subjected in refineries where the oils are cracked to produce lighter fractions, including gasoline. The organic halide and the solvating medium can be selected and proportioned to yield solvolysis reaction products equivalent to acidizing solutions ranging from relatively dilute solutions, e.g., containing less than about 5 percent by weight of acid per volume of liquid, to relatively concentrated acidizing solution, e.g., solutions in which the acid concentration is about 15 percent. In acidizing a subterranean formation by the process of the present invention, the reactants are preferably employed in a ratio productive of a solvolysis reaction product equivalent to a solution containing at least one percent hydrogen halide. In practice, such a concentration is never actually attained because the hydrogen halide is spent in the acidization reaction substantially as fast as the acid is formed.

Although various organic halides may be used as one of the reactants which, according to the invention, will form in situ the desired inorganic acid, it is preferable to employ aliphatic halides which may be either saturated or unsaturated provided they form by solvolysis the desired inorganic halide. A preferred class of these aliphatic halides are the saturated aliphatic monohalides and the unsaturated non-vinyl monohalides. Illustrative examples of these compounds are n-propyl chloride, isopropyl chloride, t-butyl chloride, allyl chloride, crotyl chloride, methyl vinyl carbinyl chloride, as well as the corresponding bromides and iodides, e.g., allyl bromide, allyl iodide, t-butyl bromide, and t-butyl iodide. The organic halide used as a reactant in the present process can be one containing functional groups other than halogen atoms. Examples of suitable polyfunctional organic halides include ethers such as bis-beta-chloroisopropyl ether, cyclic ethers such as epichlorohydrin, as well as a compound such as 1,3-dihydroxy-2-chloropropane which is sufficiently hydrophilic to dissolve enough water to effect solvolysis reaction. Organic fluorides are generally less suitable as reactants in the present process because of their tendency to form insoluble calcium flourides, but the organic fluorides can be used whenever it is desirable to contact a calcium-free formation with a mixture of hydrogen fluoride and an oil-miscible solvent.

The rates of solvolysis of these various organic halides vary within a rather wide range even though the solvolysis is effected at the same temperature and using the same solvating medium. This can be seen from the following table which presents the rates of solvolysis of a number of organic chlorides in 90% aqueous isopropyl alcohol at about 200° F.

| Compound: | $10^4 k_s$ (min.$^{-1}$) |
| --- | --- |
| n-Propyl chloride | 0.0935 |
| Isopropyl chloride | 0.165 |
| Tert-butyl chloride | 506 |
| Allyl chloride | 1.62 |
| Crotyl chloride | 30.3 |

The term $k_s$ as used herein refers to the first-order rate constant for solvolysis. Thus, $$-d[RCl]/dt = d[HCl]/dt = k_s[RCl]$$

where [RCl] and [HCl] refer to concentrations of alkyl chloride and hydrochloric acid in moles (M) per liter.

A similar test showed that allyl bromide in 90% aqueous isopropyl alcohol at 200° F. liberates hydrobromic acid 29.7 times more rapidly than allyl chloride liberates hydrochloric acid. Also, allyl iodide is even more reactive than allyl bromide.

The various alkyl halides are generally oil soluble and only very slightly soluble in water. Depending on the formation temperature and assuming that a given solvating medium is used, one may prefer to use one or another of the various organic halides. Thus, it is known that the temperature in an oil well and also in the subterranean formations surrounding it and into which it is desired to introduce the agents which form the inorganic acid in situ, may vary from a low temperature in the neighborhood of 100° F. or below to temperatures as high as 450° F. and even higher. In order to effect the solvolysis at a desired rate in the formation rather than prematurely in the well, it is frequently preferred (if not essential) to use an organic halide which is substantially inert or slowly reactive in respect to the production of hydrogen halide at the temperatures existing at the surface and in the upper portion of the well. Thus, in formations which are very hot, e.g., those having a temperature of about 350° F. or higher, it is well to consider using isopropyl chloride which is relatively slow in solvolysis reactions. In formations having a temperature of about 190–350° F., satisfactory results have been obtained by the use of allyl chloride while in cooler wells one may use crotyl chloride and its isomer, while t-butyl chloride, which is the most reactive of the above-mentioned chlorides, would be suitable for use in quite cool formations.

It has been stated that it is preferred to use alkyl monohalides. However, organic compounds having more than one halogen may also be used providing both will react under the operating conditions or providing that such compounds are used in situations in which no organic halide becomes dissolved in the oil recovered from the formation since otherwise the organic halide presence may be detrimental during the further treatment of the recovered oil.

The solvating medium to be used in connection with the organic halide is a compound which contains unshared electron pairs on an atom of the group consisting of oxygen and nitrogen atoms and is a liquid capable of reacting at the temperature of the subterranean formation with the organic halide to yield the corresponding hydrogen halide. The solvating medium should be substantially inert to and preferably non-reactive with the hydrogen halide under the reservoir conditions. Although various compounds including ketones, such as acetone and methyl ethyl ketone, nitriles, such as acetonitrile, propionitrile, cyclic ethers, such as the dioxanes and furans, etc., fall within the above class of solvating media which may be used as one of the reactants to form the hydrogen halide in situ, the preferred class of compounds comprises hydroxylic solvents in which a hydroxyl radical is attached to a radical which is selected from the group consisting of the hydrogen atom, an alkyl radical, and an acyl radical, which latter two radicals preferably do not contain more than ten carbon atoms. This hydroxylic solvent may also consist of a mixture of two or more compounds falling within the just-defined group of compounds. Therefore, the term "solvating medium" also includes mixtures of two or more compounds of the class defined herein.

The first compound of the preferred class of compounds defined immediately above, i.e., the compound in which the hydroxylic radical is attached to the hydroxyl radical is water; the second group of compounds comprises the alcohols which may be water soluble and/or oil soluble, including methyl alcohol, ethyl alcohol, and propyl alcohol, isopropyl alcohol, the butyl alcohols, including t-butyl alcohol, amyl alcohols and their higher homologs, as well as unsaturated alcohols, e.g., allyl alcohol. As to the third group, i.e., in which the hydroxyl radical is attached to an acyl radical, these are exemplified by the organic acids, e.g., acetic acid, propionic acid, the butyric acids, and the like. An organic acid such as acetic acid is capable of acidizing subterranean formations. The use of such an organic acid as the solvating medium in the present process provides a liquid which is immediately reactive in respect to acidization by the organic acid and is retarded in respect to acidization by the hydrogen halide that is formed by solvolysis reaction.

As stated above, the above-described preferred hydroxylic solvents may be used individually or in the form of mixtures containing two or more thereof. Thus, a preferred solvating medium comprises an aqueous solution of one of the aliphatic alcohols, e.g., isopropyl alcohol in water. An increase in the water-alcohol ratio changes the rate of solvolysis and acid production and generally increases the rate, but the amount of the change in the rate is dependent upon the mechanism of the individual solvolysis reaction. Thus, the solvolytic rate constants for 1.07 M t-butyl chloride at about 120° C. in isopropyl alcohol-water mixtures varies from $0.751 \times 10^{-3}$ min.$^{-1}$ for 90% aqueous isopropyl alcohol to 0.104 min.$^{-1}$ for 50% aqueous isopropyl alcohol.

The rates of solvolysis, i.e., production of hydrogen chloride for a given alkyl chloride at a given temperature can also be altered by changing the nature of the alcohol at a constant alcohol-water ratio. The following are the solvolytic rate constants for 1.07 M t-butyl chloride in 90% aqueous alcohol at 120° F.

Solvent composition:                          $10^3 k_s$ (min.$^{-1}$)
   90% aqueous methyl alcohol _____ 4.18
   90% aqueous isopropyl alcohol _____ 0.751
   90% aqueous tert-butyl alcohol _____ 0.408

It is thus seen that for these particular conditions of temperature and concentration of t-butyl chloride a change from methyl alcohol to t-butyl alcohol decreased the rate of liberation of hydrochloric acid by a factor of about 10. The following table shows the change in rate constants and half-lives with changes in temperature.

SOLVOLYTIC RATE CONSTANTS FOR 1.07 M (MOLAR) TERT-BUTYL CHLORIDE IN 90% AQUEOUS ISOPROPYL ALCOHOL AT VARIOUS TEMPERATURES

| Temperature, °F. | $10^3 k_s$ (min.$^{-1}$) | $t_{1/2}$ (min.) |
|---|---|---|
| 120 | 0.751 | 923 |
| 175 | 13.2 | 52.5 |
| 200 | 50.6 | 13.7 |

The invention will be further illustrated by reference to the following examples which are not to be considered as limiting:

Example I

An oil well which produces crude oil (from a dolomite reservoir rock having an injection rate of 3 barrels per minute and a reservoir temperature of 190° F.) through a tubing string having a capacity in the order of 55 barrels is acidized in accordance with the present process by injecting one acid-producing solution having a half-life of about nine hours at reservoir temperature in respect to the acid-producing reaction. This acidizing solution is formed by mixing 4,050 gallons of 99% isopropyl alcohol with 2,700 gallons of fresh water and 855 gallons of allyl chloride. This acidizing solution thus amounts to 7,500 gallons of 1.4 molar solution of allyl chloride in 60% aqueous isopropyl alcohol and is a liquid solution capable of reaction within the formation to form 7,500 gallons of a liquid containing 5% w./v. hydrogen chloride. Prior to the injection of the acidizing solution, the well is subjected to a conventional treatment for removing mud cake, and about 100 barrels of fresh water is injected to lower the oil saturation and displace or dilute the connate water near the well bore. After pumping the acidizing solution into the tubing string, lease crude oil is pumped in to displace the acid solution out of the tubing and into the subterranean formation. The well is then shut-in to allow the acid to form and react within the formation. By the end of ten half-lives in respect to the acid-producing reaction, 99.9% of the organic halide is converted to hydrogen halide.

The above operations were used to treat four zones of dolomite reservoir rocks which were encountered in three wells. In these wells the treated zones were each shut-in for one week after which the wells were swabbed substantially free of spent acidizing solution. In each case an analysis of the spent acidizing solution demonstrated that all of the allyl chloride had reacted so that no organic halide remained in the formations. The treatments by the present process resulted in production rates substantially better than those obtainable by conventional treatments.

One of the wells that were so treated is off-set by two other wells. The off-set wells produce from adjacent portions of the same formation and each has been acidized by conventional procedures. The stabilized production of one of the off-set wells is 90 barrels per day and that of the other is 135 barrels per day. The stabilized production of the well treated in accordance with the present process is 200 barrels per day.

Example II

An oil well having reservoir and mechanical conditions essentially as described in Example I is acidized by forming a 1.4 molar solution of alpha- and gamma-methylallyl chlorides in 60% aqueous isopropyl alcohol and injecting the solution by a procedure equivalent to that described in Example I. This solution has a comparatively short half-life in respect to the acid-producing reaction and this alpha- and gamma-methylallyl treatment necessitates a shut-in period of only five hours at the end of which time all of the chloride is converted to hydrogen chloride. The result obtained by this treatment is substantially the same as the result described in Example I.

Example III

An oil well having reservoir and mechanical conditions substantially equivalent to those described in Example I, except for a reservoir temperature of 310° F., is acidized by forming 1.4 molar solution of n-propyl chloride in 90% aqueous methyl alcohol and injecting the solution by a procedure equivalent to that described in Example I. This treatment necessitates a shut-in time of only three days. The result obtained by this treatment is substantially the same as the result described in Example I.

Example IV

A producing well having reservoir and mechanical conditions substantially equivalent to those described in Example I, except for a reservoir temperature of 350° F., is acidized by forming a 1.4 molar solution of isopropyl chloride in 70% aqueous isopropyl alcohol and injecting the solution by a procedure equivalent to that described in Example I. This treatment necessitates a shut-in time of just one day. The result obtained by this treatment is substantially the same as the result described in Example I.

Example V

A producing well having reservoir and mechanical conditions substantially equivalent to those described in Example I, except for a reservoir temperature of 175° F., is acidized by forming a 1.4 molar solution of t-butyl chloride in 90% aqueous isopropyl alcohol and injecting the solution by a procedure equivalent to that described in Example I. This treatment necessitates a shut-in time of only 17 hours. The result obtained by this treatment is substantially the same as the result described in Example I.

Example VI

A producing well having reservoir and mechanical conditions substantial to those described in Example I, except for a reservoir temperature of 175° F., is acidized by forming a 2.9 molar solution of tertiary butyl chloride in 90% aqueous isopropyl alcohol and injecting the solution by a procedure equivalent to that described in Example I. This solution is capable of reacting within the formation to form a liquid containing 10% hydrogen chloride. This treatment requires a shut-in time of only two days. This treatment provides a permeability increase substantially greater than that described in Example I.

Example VII

A producing well having reservoir and mechanical conditions substantially equivalent to those described in Example I, except for a reservoir temperature of 120°F., is acidized by forming a 1.4 molar solution of t-butyl chloride in 90% aqueous t-butyl alcohol and injecting the solution by a procedure equivalent to that described in Example I. This treatment necessitates a shut-in time of 2.5 days. The result obtained by this treatment is substantially the same as the result described in Example I.

Example VIII

An oil well in which the reservoir and mechanical conditions are essentially as described in Example I, except that the reservoir temperature is 280° F., was acidized in the following manner. The acidizing solution contained, in volume percent of the total volume of solution, 22% allyl chloride, 22% water, and 56% isopropyl alcohol.

The total volume of solution was 6,500 gallons of a solution that was equivalent to an equal volume of ordinary 10% hydrogen chloride when the solvolysis reaction was complete.

The acidizing solution was injected into the formation to be treated in the manner described in Example I. The well was shut in for 48 hours, after which it flowed the spent acidizing fluid. The spent acidizing fluid at the end of the load (i.e., after the well flowed a volume of fluid equal to that pumped into the well) contained less than about 3 parts per million parts of allyl chloride. The stabilized production rate of the well amounted to an increase of at least 20% above the previous stabilized production rate.

In this example the organic halide and the solvating medium were selected and compounded to form an acidizing solution having a reaction rate such that by the time an aliquot portion reached the formation that portion contained from 0.1 to 0.5% (weight/volume) of hydrogen chloride. In the acidizing solution used in Example I, the acid content was less than 0.1% when the solution reached the formation to be treated.

It is evident from the above data that the invention described and claimed herein has several advantages over the acidization techinques known and used heretofore:

(1) Appropriate choice of the organic halide and of the solvating medium allows the commingling of the solution at the surface and injection and conveyance thereof through the well as an essentially neutral liquid.

(2) Since the acidization solution does not start to release the hydrogen halide acid at any noticeable or appreciable rate until it is at the reservoir temperature, corrosion problems in the pipe and tubing are greatly reduced.

(3) Also, as the acidizing solution enters a carbonate formation, it will displace both connate water and oil ahead of it, at the same time producing hydrogen halide at a preselected rate dependent upon the particular organic halide and solvating medium employed. Thus, in the case of a water flood program, the water injectivity of the formation would be increased by the dissolving of a portion of the rock matrix and also by the displacement of residual oil.

I claim as my invention:

1. A method of increasing the flow capacity of an oil-bearing subterranean formation penetrated by a well bore, which comprises simultaneously introducing through said well bore and injecting into said formation at a pressure greater than the formation pressure a solution of aliphatic monohalide and a stoichiometric excess of a hydroxylic solvent in which the radical attached to the hydroxyl radical is selected from the group consisting of the hydrogen atom, an alkyl radical and an acyl radical, said aliphatic monohalide and said hydroxylic solvent being present in amounts to produce by solvolysis sufficient hydrogen halide to increase substantially the flow capacity of the subterranean formation by reaction between the hydrogen halide and solid components of the formation, and dissolving a portion of the formation by maintaining said solution of said hydroxylic solvent and said aliphatic monohalide in said formation for a time sufficient to permit, at the temperature of the formation, a reaction therebetween to form the hydrogen halide.

2. A method of increasing the flow capacity of a subterranean formation penetrated by a well bore which is substantially free of a mud cake, which comprises introducing through said well bore and injecting into said formation at a pressure greater than the formation pressure a liquid solution containing an aliphatic monohalide and a stoichiometric excess of a hydroxylic solvent in which the radical attached to the hydroxyl radical is selected from the group consisting of the hydrogen atom, an alkyl radical and an acyl radical, said aliphatic monohalide and said hydroxylic solvent being only relatively slowly reactive with each other at the temperatures existing during passage of the solution down through the well bore but significantly more reactive at the temperature of the formation, and said aliphatic halide and said hydroxylic solvent being present in said solution in amounts to produce by solvolysis sufficient hydrogen halide to increase substantially the flow capacity of the subterranean formation by reaction between said hydrogen halide and solid components of the formation; and dissolving a portion of the formation by maintaining said introduced solution in said formation for a time sufficient to effect, at the formation temperature, interaction between said aliphatic halide and the hydroxylic solvent to produce sufficient hydrogen halide.

3. The method according to claim 2 wherein the aliphatic monohalide is a monochloride.

4. A method of increasing the flow capacity of a subterranean formation penetrated by a well bore which is substantially free of a mud cake, which comprises introducing through said well and injecting into said formation at a pressure greater than the formation pressure bore a liquid solution of an aliphatic monohalide, water, and a stoichiometric excess of an aliphatic alcohol, said aliphatic monohalide and said water and alcohol being present in a mixture in amounts to produce by solvolysis sufficient hydrogen halide to increase substantially the productivity of the subterranean formation by reaction between said hydrogen halide and solid components of the formation, and dissolving a portion of the formation by maintaining said introduced solution in said formation for a time sufficient to effect, at the formation temperature, inter-action between said aliphatic monohalide and said aqueous alcohol solution to produce sufficient hydrogen halide.

5. The method according to claim 4 wherein the aliphatic monohalide is allyl chloride.

6. The method according to claim 5 wherein the aqueous alcohol solution is aqueous isopropyl alcohol.

7. In treating a well by pumping a liquid through a conduit in the well and into a subterranean formation encountered by the well which is substantially free of a mud cake, the steps comprising:

(a) determining the temperatures existing within the well;

(b) determining the time required to pump a liquid through a conduit in the well to a selected distance within a subterranean formation encountered by the well;

(c) intermingling in a liquid solution an organic halide and a stoichiometric excess of a solvating medium capable of interacting to produce a hydrogen halide at a rate affected by temperature in a manner such that, during the time required to pump a liquid through the conduit to the selected distance within a formation at the temperatures existing in the well, only some but less than all of the hydrogen halide is produced; and (d) pumping the solution of organic halide and solvating medium through the conduit and into the subterranean formation.

8. In a process of treating a subterranean formation which is substantially free of a mud cake by pumping a liquid thereinto, the steps comprising:

(a) determining the temperatures existing within a well drilled into the subterranean formation to be treated;

(b) determining the time required to convey a liquid through a conduit in the well to a selected distance within the subterranean formation encountered by the well;

(c) pumping through a conduit in the well a solution of an organic halide and a stoichiometric excess of a solvating medium capable of interacting to produce a hydrogen halide at a rate affected by temperature in a manner that, during the time required to introduce a solution of said organic halide and solvating medium through the conduit to the selected distance within the formation, at the temperatures existing in the well, only a portion of the hydrogen halide is produced, (d) injecting simultaneously into the subterranean formation the said organic halide and solvating medium; and (e) allowing the said organic halide and solvating medium to remain in the subterranean formation for a time sufficient to cause the organic halide to be converted to hydrogen halide which causes acidization of the subterranean formation.

9. A process of treating the matrix of a subterranean formation penetrated by a well bore which is substantially free of a mud cake, which comprises introducing through said well bore and injecting into said mud-free portions of said formation matrix at a pressure greater than the formation pressure a liquid solution comprising a solution of an organic halide in a stoichiometric excess of a solvating medium comprising a compound containing an atom with unshared electron pairs from the group of atoms consisting of oxygen and nitrogen atoms, said solvating medium being capable of reacting at the temperature of the subterranean formation with the organic halide to yield hydrogen halide, and leaving said liquid mixture in said formation for a time suffiicent for the so-formed hydrogen halide to dissolve a portion of said formation.

10. A process according to claim 9, wherein the solvating medium is relatively less reactive in a given period of time with the organic halide under the temperature conditions existing at the surface of the well but is significantly more reactive with the organic halide at the temperature of the subterranean formation whereby a major portion of reaction between said solvating medium and said organic halide takes place within the formation away from the well bore.

11. A process of treating the matrix of an oil-bearing subterranean formation penetrated by a well bore which is substantially free of a mud cake, which comprises introducing through said well and injecting into said formation matrix at a pressure greater than the formation pressure a liquid solution containing a solution of an organic monohalide in a solvating medium comprising a compound containing an atom with unshared electron pairs from the group of atoms consisting of oxygen and nitrogen atoms, said liquid solution containing said organic monohalide and a stoichiometric excess of said solvating medium capable of reacting at the temperature of the subterranean formation with the organic halide to yield a liquid mixture containing at least about one percent by weight per volume of hydrogen halide, and maintaining said liquid solution in contact with the formation to acidize the latter and thereby increase the production of oil therefrom.

References Cited by the Examiner
UNITED STATES PATENTS

| | | | |
|---|---|---|---|
| 2,059,459 | 11/36 | Hund et al. | 166—38 |
| 2,343,136 | 2/44 | Dodson | 166—42.1 |
| 2,414,668 | 1/47 | Ratcliffe | 166—44 |
| 2,889,884 | 6/59 | Henderson | 166—42.1 |
| 2,910,436 | 10/59 | Fatt et al. | 166—42 |

CHARLES E. O'CONNELL, *Primary Examiner.*